United States Patent [19]

Kato

[11] Patent Number: 5,671,908
[45] Date of Patent: Sep. 30, 1997

[54] ELASTIC MOUNT AND PROCESS OF MANUFACTURING THE SAME

[75] Inventor: Rentaro Kato, Kasugai, Japan

[73] Assignees: Tokai Rubber Industries, Ltd.; Showa Aluminum Corporation, both of Japan

[21] Appl. No.: 764,923

[22] Filed: Dec. 16, 1996

[30] Foreign Application Priority Data

Dec. 27, 1995 [JP] Japan ................... 7-340585

[51] Int. Cl.$^6$ ................... F16F 9/16; F16M 7/66
[52] U.S. Cl. ................... 267/140.12; 29/897.2; 29/417; 267/141.2
[58] Field of Search ................... 267/140.11–140.13, 267/273, 279, 292–294, 141.2; 248/562, 566, 636, 638; 29/417, 897.2; 264/274

[56] References Cited

U.S. PATENT DOCUMENTS

| 4,998,345 | 3/1991 | Funahashi et al. | 29/897.2 |
| 5,397,112 | 3/1995 | Roth et al. | 267/140.12 |

FOREIGN PATENT DOCUMENTS

| 5-50860 | 3/1993 | Japan . | |
| 6137355 | 5/1994 | Japan | 267/140.12 |

Primary Examiner—Robert J. Oberleitner
Assistant Examiner—Chris Schwartz
Attorney, Agent, or Firm—Parkhurst, Wendel & Burr, L.L.P.

[57] ABSTRACT

An elastic mount comprising: an outer hollow member which is formed of an aluminum alloy and has an inner hole; an inner shaft member which extends in the inner hole of the outer member; an elastic member which is formed by vulcanization of a rubber material in the inner hole between the outer member and the inner member to elastically connect the outer and inner members to each other; the outer member having an inner circumferential surface including a plurality of recesses and a plurality of protrusions which cooperate with each other to define the inner hole and each of which continuously extends in an axial direction of the inner hole; the recesses and the protrusions being alternate with each other at a pitch of 0.5 mm to 2.0 mm in a circumferential direction of the inner hole; a top end of each of the protrusions having a height of 0.3 mm to 1.0 mm from respective bottom ends of the two recesses on both sides of, and adjacent to, each protrusion; the elastic member being directly bonded to the inner surface of the outer member by the vulcanization of the rubber material.

12 Claims, 6 Drawing Sheets

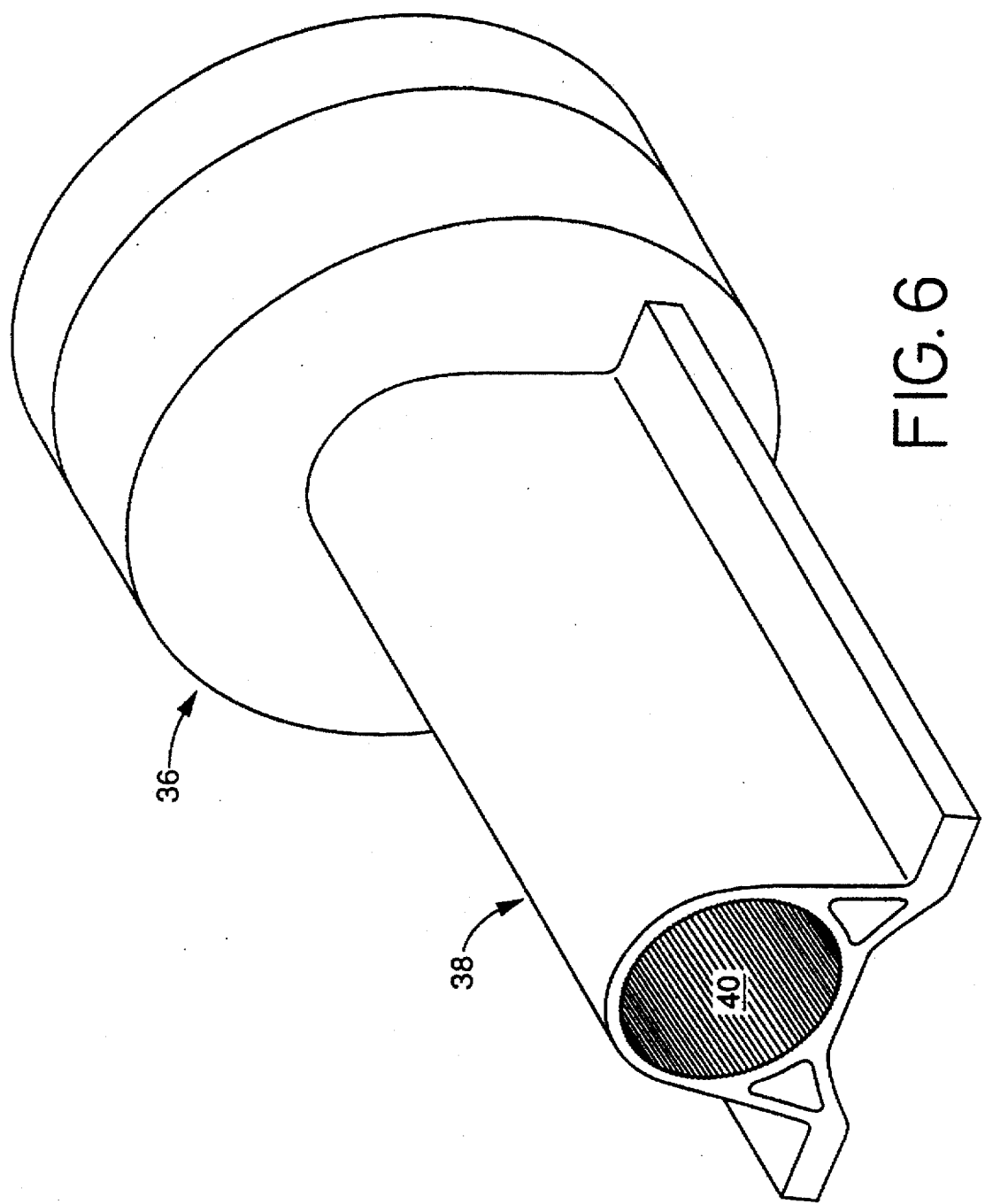

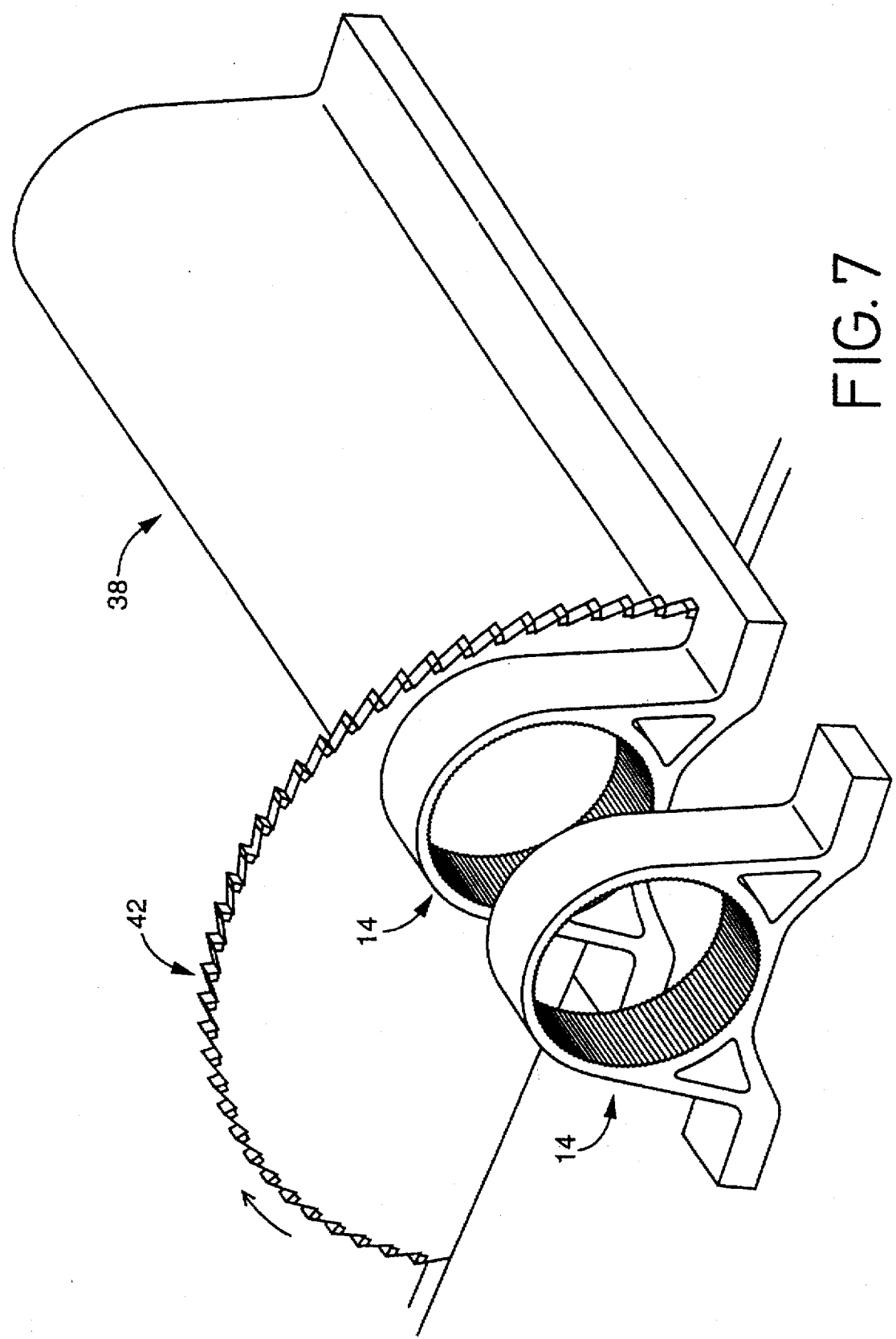

ELASTIC MOUNT AND PROCESS OF MANUFACTURING THE SAME

BACKGROUND OF THE INVENTION

1. Field of the Art

The present invention relates to an elastic mount as a vibration damping device, which elastic mount is suitably used as an engine mount, a suspension bushing, a body mount or a differential mount for a motor vehicle. The present invention is also concerned with a process of manufacturing the elastic mount. More particularly, the invention relates to such an elastic mount having an outer follow member made of an aluminum alloy, and the process of manufacturing the same.

2. Discussion of the Related Art

As one type of a vibration damping device interposed between two members of a vibration system for flexibly connecting these two members, there is known an elastic mount having an inner sleeve and an outer sleeve which are disposed in a radially spaced-apart relation with each other and are elastically connected to each other by an elastic member interposed therebetween. The inner sleeve and the outer sleeve of the elastic mount are attached to the respective two members of the vibration system in a vibration damping manner. In recent years, it is considered to employ an outer sleeve which is formed of an aluminum alloy for reducing the weight of the elastic mount. Further, for reducing the number of the required components of the elastic mount and simplifying the structure thereof, it is proposed to directly bond the outer circumferential surface of the elastic member to the inner circumferential surface of the outer sleeve, in the process of vulcanization of a rubber material of the elastic member.

However, when the elastic member is directly bonded by vulcanization to the inner circumferential surface of the outer sleeve formed of the aluminum alloy as described above, the elastic member may not exhibit required bonding strength or durability. In view of this, the inner circumferential surface of the outer sleeve is subjected to a suitable surface-roughening treatment such as shot blasting, so as to improve the bonding strength between the elastic member and the outer sleeve.

However, producing the elastic mount as described above requires a cumbersome process like shot blasting, undesirably pushing up the cost of manufacture of the elastic mount. Moreover, some portions of the outer sleeve do not need any surface-roughening treatment. Accordingly, these portions must be covered during the shot blasting operation so that the portions may not be surface-roughened. Thus, the elastic mount constructed as described above suffers from lowered production efficiency and increased cost of manufacture. The above-described portions of the outer sleeve which do not need surface-roughening serve as, for instance, fixing surfaces at which the outer sleeve is fixed to one of the members of the vibration system. If the fixing surfaces are toughened, there would be a possibility of rattling of the fixing surfaces of the outer sleeve because of wearing of the roughened fixing surfaces. In view of this, it is desirable that the fixing surfaces have flat surfaces for assuring a high degree of contact with respect to the member of the vibration system.

SUMMARY OF THE INVENTION

It is therefore a first object of the present invention to provide a structurally improved elastic mount which can be produced with excellent efficiency and which can easily and advantageously assure sufficient bonding strength of an elastic member thereof with respect to an outer member thereof without needing any surface-roughening treatment such as shot blasting.

It is a second object of the invention to provide an efficient process of manufacturing such an elastic mount which can advantageously and stably assure sufficient bonding strength of an elastic member thereof with respect to an outer member thereof.

The above-indicated first object may be attained according to a first aspect of the present invention which provides an elastic mount comprising: an outer hollow member which is formed of an aluminum alloy and has an inner hole; an inner shaft member which extends in the inner hole of the outer member; an elastic member which is formed by vulcanization of a rubber material in the inner hole between the outer member and the inner member to elastically connect the outer and inner members to each other; the outer member having an inner circumferential surface including a plurality of recesses and a plurality of protrusions which cooperate with each other to define the inner hole and each of which continuously extends in an axial direction of the inner hole; the recesses and the protrusions being alternate with each other at a pitch of 0.5 mm to 2.0 mm in a circumferential direction of the inner hole; a top end of each of the protrusions having a height of 0.3 mm to 1.0 mm from respective bottom ends of the two recesses on both sides of, and adjacent to, each protrusion; the elastic member being directly bonded to the inner surface of the outer member by the vulcanization of the rubber material.

In the elastic mount constructed as described above, the surface area of the inner circumferential surface of the outer member, in other words, the bonding area of the elastic member to the inner circumferential surface of the outer member is sufficiently increased owing to the presence of the recesses and the protrusions formed over the entire inner circumferential surface of the outer member. This arrangement advantageously assures considerably improved bonding strength of the elastic member with respect to the outer member, without effecting any particular or additional surface-roughening treatment on the inner circumferential surface of the outer member.

The recesses and protrusions continuously extend in the axial direction of the outer member. These recesses and protrusions can be formed at the same time when the outer member is produced by extrusion using a die or a mandrel which has a profile that gives the recesses and protrusions over the inner circumferential surface of the outer member to be obtained. This arrangement eliminates any particular or additional process for forming the recesses and protrusions on the inner circumferential surface of the outer member, to thereby assure enhanced efficiency in manufacturing the outer member.

If the height of the top ends of the protrusions as measured from the bottom ends of the recesses is smaller than 0.3 mm or if the pitch of the recesses and protrusions is larger than 2.0 mm, the surface area of the inner circumferential surface of the outer member tends to be insufficient, making it difficult to sufficiently improve the bonding strength of the elastic member to the outer member. On the other hand, if the above-indicated height is larger than 1.0 mm or if the above-indicated pitch is smaller than 0.5 mm, the inner circumferential surface of the outer member tends to have edged portions, undesirably lowering durability of the elastic member bonded to the edged inner circumferential surface of the outer member and deteriorating formability of the outer member formed by using, e.g., a die having a corresponding profile.

The configurations of the recesses and protrusions are not particularly limited in the present invention. However, according to one preferred feature of the invention, the inner circumferential surface of the outer hollow member comprises a continuous surface which is continuous in the circumferential direction of the inner hole and has a corrugated shape defined by respective inner surfaces of the recesses and respective outer surfaces of the protrusions. In this case, the continuous surface is smoothly continuous in the circumferential direction of the inner hole and does not have any discontinuous portions such as edged portions. Further, the corrugated shape of the continuous surface is defined by substantially arcuate inner surfaces of the recesses and substantially arcuate outer surfaces of the protrusions. Each of the arcuate inner surfaces of the recesses and each of the arcuate outer surfaces of the protrusions are connected to each other by a surface having a tangent common to the arcuate inner surface of each recess and the arcuate outer surface of each protrusion. This arrangement is effective to reduce or avoid stresses which would act on local portions of the elastic member bonded to the outer member, to thereby assure improved durability of the bonding surface of the elastic member bonded to the outer member.

According to another preferred feature of the invention, the outer hollow member has at least one flat end face in which the inner hole opens, and the elastic member comprises an end portion covering at least a portion of the flat end face so that a surface of the elastic member bonded to the outer member ends on the flat end face. In this arrangement, a mold cavity to which the rubber material of the elastic member is injected is easily closed in spite of the presence of the recesses and protrusions over the inner circumferential surface of the outer member. Further, the present arrangement is free from burrs which would be generated at the end portion of the elastic member.

In the present invention, the outer member may be a simple hollow body. However, according to still another preferred feature of the invention, the outer hollow member includes at least one integral connection portion which projects from an outer surface thereof and continuously extends over an entire length thereof in the axial direction, the connection portion being adapted to be connected to a support member for fixing the elastic mount to the support member. According to this arrangement, the connection portion can be easily formed integrally with the outer member at the same time when the outer member is produced by extrusion.

The above-indicated second object of the present invention may be attained according to a second aspect of the invention which provides a process of manufacturing an elastic mount, comprising the steps of: (a) extruding an aluminum-alloy blank to obtain an extrudate having an extruded inner hole which continuously extends in a direction of extrusion of the blank, the extrudate having an inner circumferential surface including a plurality of recesses and a plurality of protrusions which cooperate with each other to define the extruded inner hole and each of which continuously extends in the extrusion direction, the recesses and the protrusions being alternate with each other at a pitch of 0.5 mm to 2.0 mm in a circumferential direction of the extruded inner hole, a top end of each of the protrusions having a height of 0.3 mm to 1.0 mm from respective bottom ends of the two recesses on both sides of, and adjacent to, each protrusion; (b) cutting the extrudate into a plurality of outer hollow members each of which has a predetermined length in the extrusion direction, each outer member having a cut inner hole having the predetermined length in the extrusion direction; (c) placing an inner shaft member in each outer member such that the inner member extends in the cut inner hole of each outer member; and (d) vulcanizing a rubber material between each outer member and the inner member to produce an elastic member bonded to the inner member and the inner surface of the outer member and thereby elastically connect the inner and outer members to each other.

According to the process of the present invention, the extrudate is cut into a plurality of outer members, leading to enhanced efficiency in manufacturing the outer member having the cut inner hole. Further, the recesses and the protrusions are formed over the inner circumferential surface of each of the outer members concurrently when the outer members are extruded. Therefore, the bonding area of the elastic member with respect to the outer member is considerably increased without effecting any particular or additional operation for forming the recesses and protrusions, resulting in the improved bonding strength to be exhibited by the elastic member.

The extrudate having the extruded inner hole may be obtained according to a known hollow-member forming manner in which a hollow billet and a mandrel are used. Alternatively, the extrudate may be obtained by extruding a solid billet by using a port hole die or a bridge die, for example. Generally, the extrudate is advantageously obtained by hot extrusion.

BRIEF DESCRIPTION OF THE DRAWINGS

The above and optional objects, features and advantages of the present invention will be better understood by reading the following detailed description of preferred embodiments of the invention, when considered in connection with the accompanying drawings, in which:

FIG. 6 is a view explaining one process step for manufacturing the outer sleeve of FIG. 4; and FIG. 7 is a view explaining another process step for manufacturing the outer sleeve of FIG. 4.

DETAILED DESCRIPTION OF THE PREFERRED EMBODIMENTS

Figure 1:
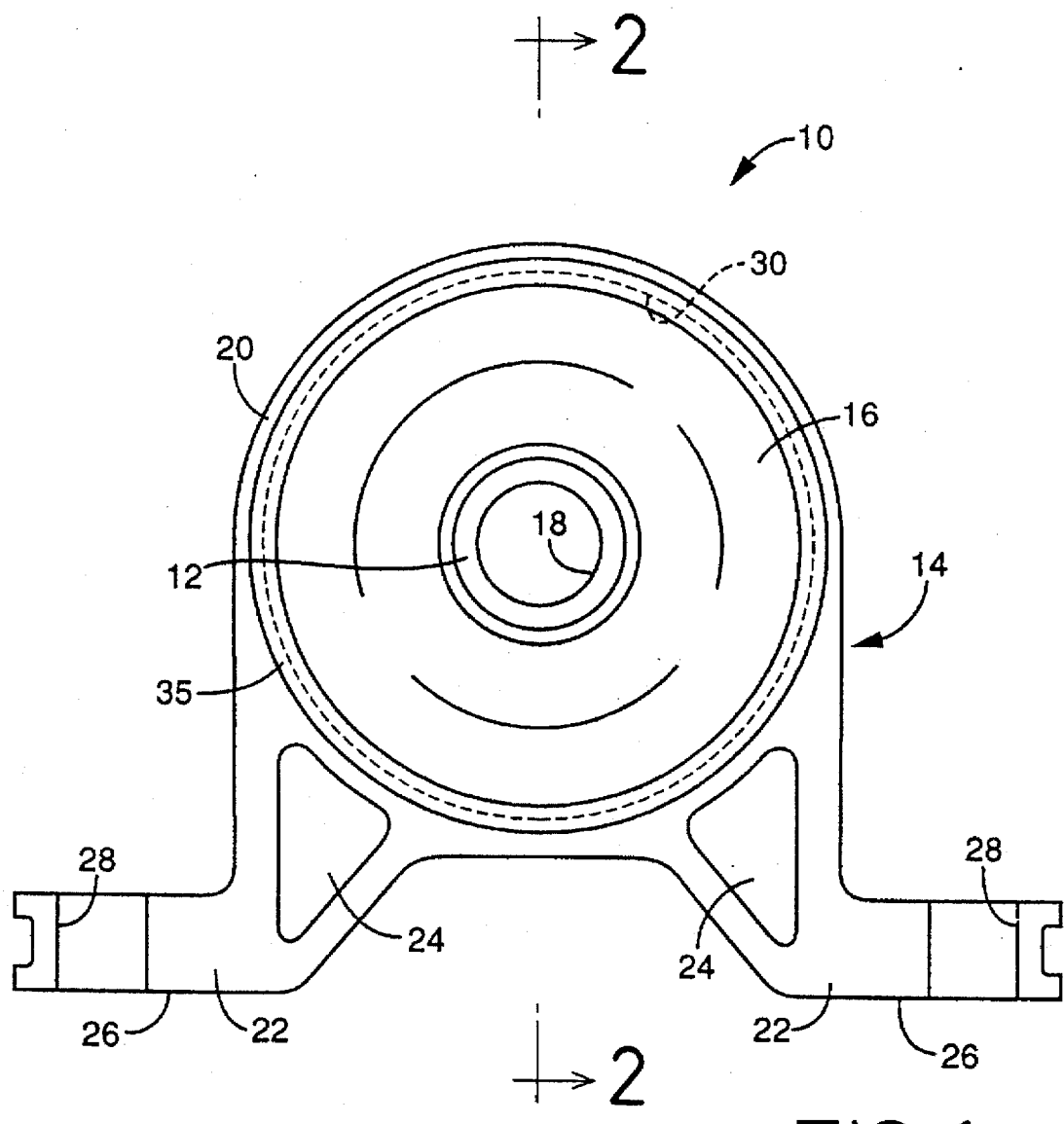
FIG. 1 is a front elevational view of an engine mount embodying the present invention.
Figure 2:
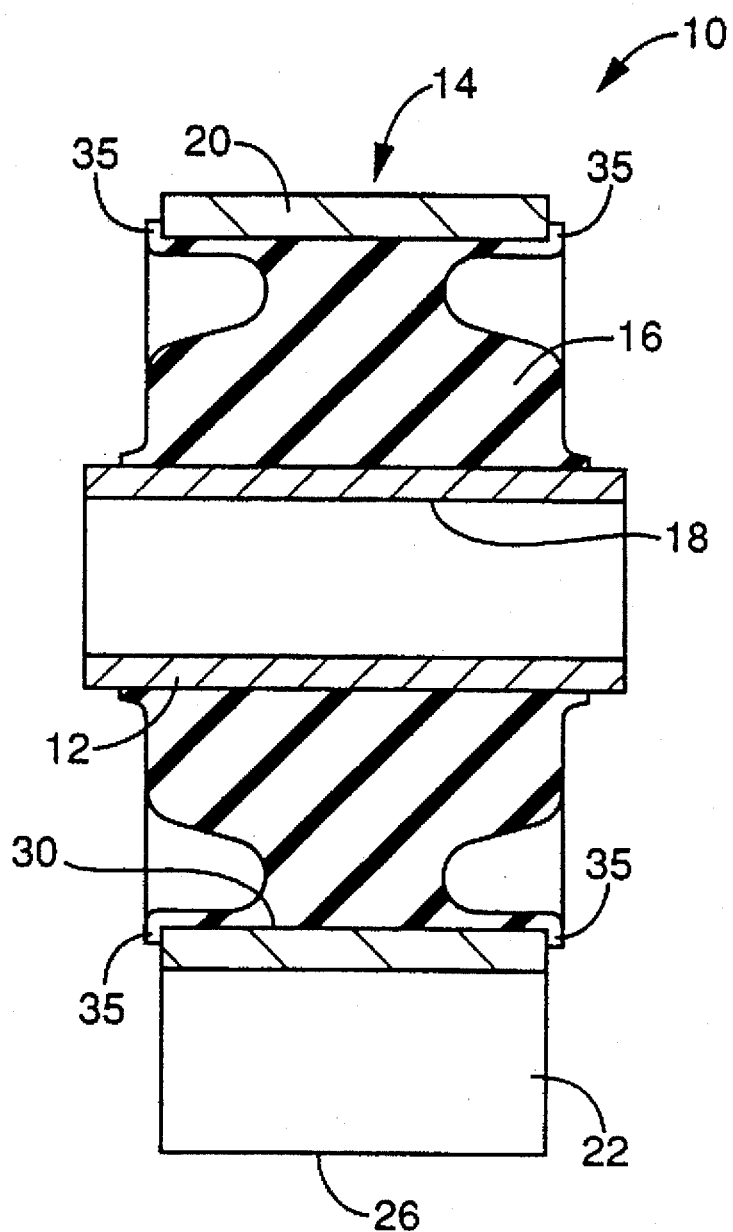
FIG. 2 is a cross sectional view taken along line 2—2 of FIG. 1.
Figure 3:
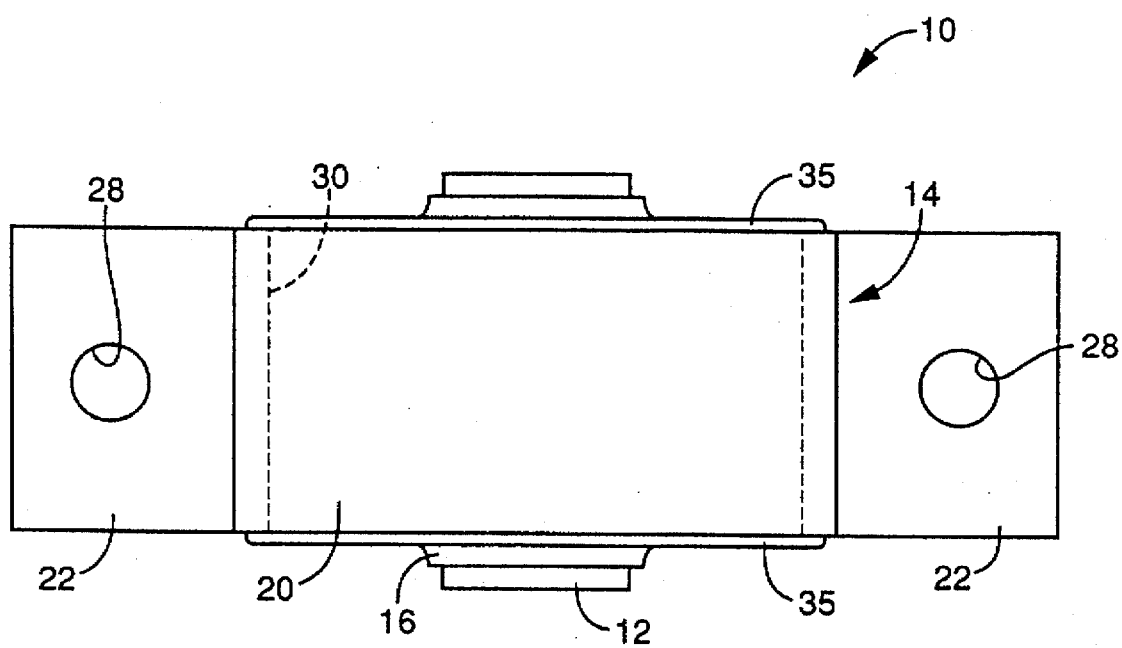
FIG. 3 is a top plan view of the engine mount of FIG. 1.

Referring to FIGS. 1 through 3, there will be described one embodiment of the present invention in the form of an engine mount 10 for use on a motor vehicle. The engine mount 10 includes an inner shaft member in the form of an inner sleeve 12 made of metal and an outer hollow member in the form of an outer sleeve 14 made of an aluminum alloy. The inner and outer sleeves 12, 14 are elastically connected to each other by an elastic member 16 interposed therebetween. The present engine mount 10 is installed on the motor vehicle such that the inner sleeve 12 is attached to one of a power unit and a body of the vehicle while the outer sleeve 14 is attached to the other of the power unit and the vehicle body, so that the power unit is mounted on the vehicle via the engine mount 10 in a vibration damping or isolating manner.

The inner sleeve 12 is a cylindrical member having a small diameter and formed of a rigid material such as a steel pipe. The inner sleeve 12 has an inner hole 18 through which a bolt is inserted so as to fix the inner sleeve 12 to one of the power unit and the vehicle body not shown.

The outer sleeve 14 is made of an aluminum alloy, and includes a cylindrical body portion 20 having a large diameter and a pair of connection portions in the form of a pair of legs 22, 22 which are integrally formed with the cylindrical body portion 20, such that the legs project radially outwardly from an outer surface of the cylindrical body portion 20. Each of the legs 22, 22 extends over the entire axial length of the cylindrical body portion 20. According to this arrangement, the outer sleeve 14 has a constant cross sectional shape throughout the entire axial length thereof.

Each of the legs 22, 22 has an axial through-hole 24 which extends therethrough over the entire axial length thereof for the purpose of reducing the weight of the outer sleeve 14. Each of the legs 22, 22 further includes a flat fixing surface 26 and a bolt hole 28. The outer sleeve 14 is fixed to one of the vehicle body and the power unit by bolts inserted into the respective bolt holes 28 formed through the legs 22, such that the fixing surfaces 26 of the legs 22 are held in contact with one of the vehicle body and the power unit.

As shown in FIG. 2, the cylindrical body portion 20 of the outer sleeve 14 has an axial length slightly smaller than that of the inner sleeve 12. The cylindrical body portion 20 has an inner hole 30 whose diameter is larger than the outside diameter of the inner sleeve 12. The inner sleeve 12 is inserted through the inner hole 30 such that the inner sleeve 12 is disposed substantially coaxially with the cylindrical body portion 20 of the outer sleeve 14. Between the inner sleeve 12 and the cylindrical body portion 20 of the outer sleeve 14, the elastic member 16 is interposed for elastically connecting these two members 12, 14 with each other. The elastic member 16 is a generally thick-walled cylindrical member. The inner circumferential surface of the elastic member 16 is bonded by vulcanization to the outer circumferential surface of the inner sleeve 12 while the outer circumferential surface of the elastic member 16 is bonded by vulcanization to the inner circumferential surface of the cylindrical portion 20 of the outer sleeve 14, to thereby form an integrally vulcanized assembly.

Figure 4:
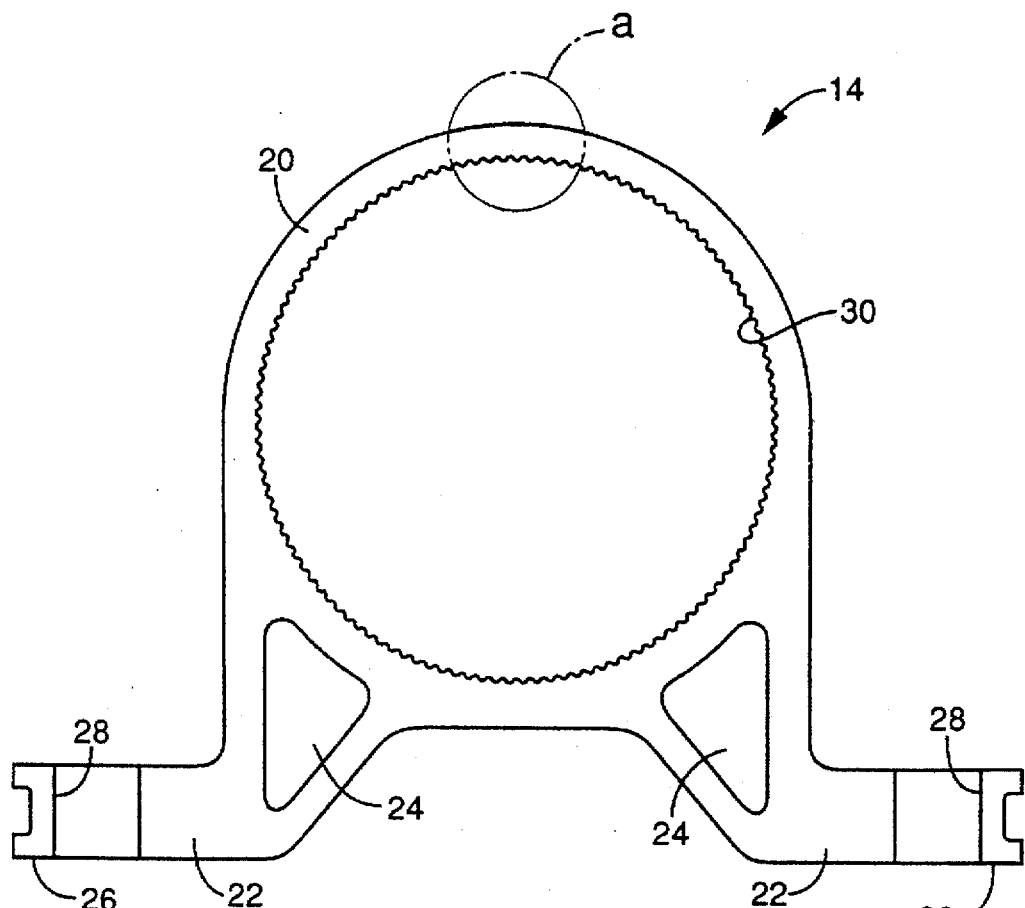
FIG. 4 is a front elevational view of an outer sleeve of the engine mount of FIG. 1.
Figure 5:
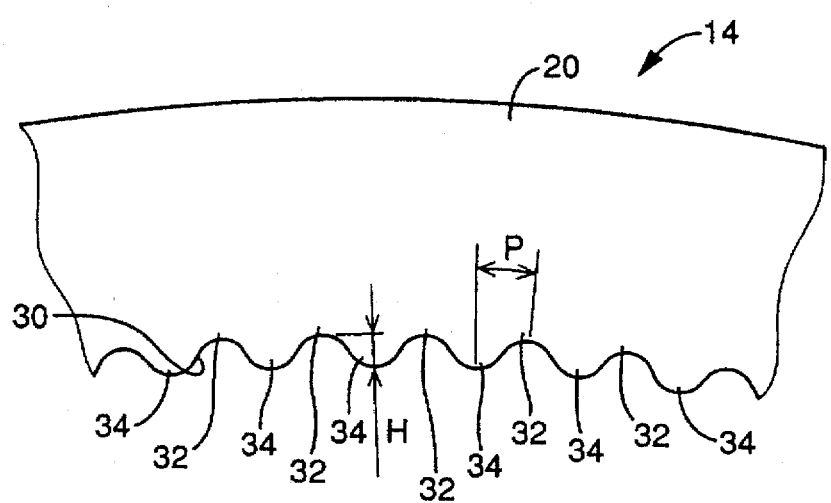
FIG. 5 is an enlarged view of the portion indicated by "a" in FIG. 4.

As shown in FIGS. 4 and 5, the inner circumferential surface of the cylindrical body portion 20 of the outer sleeve 14 is formed with a plurality of recesses 32 and a plurality of protrusions 34 which cooperate with each other to define the inner hole 30 and each of which extends in the axial direction of the inner hole 30. The recesses 32 and the protrusions 34 are alternate with each other in the circumferential direction of the inner hole 30. Each of the protrusions 34 has a top end having a height of 0.3 mm to 1.0 mm from respective bottom ends of the two recesses 32 on both sides of, and adjacent to, the protrusion 34. The recesses 32 and the protrusions 34 are alternate with each other at a pitch of 0.5 mm to 2.0 mm in the circumferential direction of the inner hole 30. In other words, a circumferential distance between the bottom end of each recess 32 and the top end of each of the two adjacent protrusions 34 falls in the range of 0.5 mm to 2.0 mm.

For forming the elastic member 16, initially, the outer sleeve 14 is disposed in a suitable mold with the inner sleeve 12 placed in the inner hole 30 of the outer sleeve 14. Then, a suitable rubber material is vulcanized in the inner hole 30 between the cylindrical body portion 20 of the outer sleeve 14 and the inner sleeve 12, thereby forming the elastic member 16. Thus, the elastic member 16 is bonded by vulcanization at its outer circumferential surface to the inner circumferential surface of the cylindrical body portion 20.

As shown in FIG. 2, the elastic member 16 has, at axially opposite ends thereof, radially outer end portions 35 which protrude axially outwardly from respective axial end faces of the cylindrical body portion 20 of the outer sleeve 14. Each of the end portions 35 extends on the corresponding axial end face of the cylindrical body portion 20 of the outer sleeve 14, so as to cover a radially inner portion of the axial end face of the cylindrical body portion 20. Thus, the end portions 35 of the elastic member 16 are bonded by vulcanization to the radially inner annular portions of the respective axial end faces of the cylindrical body portion 20. More specifically described, when the inner and outer sleeves 12, 14 are placed in the mold into which the rubber material of the elastic member 16 is injected, a mold cavity which gives the elastic member 16 by vulcanization of the rubber material is defined by the abutting contact of the mold and the axial end faces of the cylindrical portion 20 of the outer sleeve 14. According to this arrangement, each of the end portions 35 of the elastic member 16 bonded to the outer sleeve 14 ends on the corresponding axial end face of the outer sleeve 14. Since the end portions 35 of the elastic member 16 cover the radially inner portions of the axial end faces of the outer sleeve 14, the mold cavity for forming the elastic member 16 is fluid-tightly closed at the opposite axial end faces of the outer sleeve 14, in spite of the presence of the recesses and protrusions 32, 34 formed over the inner circumferential surface of the cylindrical body portion 20 of the outer sleeve 14. This arrangement is effective to avoid otherwise possible generation of burrs at axially opposite end portions of the elastic member 16.

In the present engine mount 10 constructed as described above, the surface area of the inner circumferential surface of the outer sleeve 14 is significantly increased owing to the presence of the recesses 32 and the protrusions 34, and the bonding area of the elastic member 16 with respect to the inner circumferential surface of the outer sleeve 14 is accordingly increased. This arrangement enables the elastic member 16 to be bonded to the cylindrical body portion 20 of the outer sleeve 14 with sufficiently high bonding strength and bonding durability.

In the present embodiment, the inner surface of each of the recesses 32 and the outer surface of each of the protrusions 34 both assume arcuate shapes. The arcuate inner and outer surfaces of each recess 32 and each protrusion 34 are connected to each other by a surface which does not have any discontinuous portions, i.e., edged portions. Accordingly, the inner circumferential surface of the outer sleeve 14 has a corrugated shape which is continuous in the circumferential direction of the inner hole 30. Since the corrugated inner circumferential surface of the outer sleeve 14 does not have any edged portions as described above, this arrangement is effective to reduce or avoid stresses which would otherwise act on local portions of the elastic member 16 corresponding to the edged portions of the inner circumferential surface of the outer sleeve 14. Therefore, in the present engine mount 10, the elastic member 16 is bonded to the cylindrical body portion 20 of the outer sleeve 14 with enhanced bonding strength and bonding durability.

When the inner surface of each recess 32 and the outer surface of each protrusion 34 are formed so as to have the respective arcuate shapes, a radius of curvature (r) of the inner and outer surfaces of the recess 32 and the protrusion 34 is preferably limited to the range of $0.3 \text{ mm} \leq r \leq 1.0 \text{ mm}$. More preferably, the inner surface of the recess 32 and the outer surface of the protrusion 34 have the same radius of curvature. This arrangement provides a smoothly corrugated inner circumferential surface of the cylindrical body portion 20, and reduces or avoids stresses which would be applied to local portions of the elastic member 16 if the inner and outer surfaces of the recesses 32 and the protrusions 34 have a smaller radius of curvature. Thus, the elastic member 16 exhibits further enhanced bonding strength and bonding durability.

The outer sleeve 14 formed of the aluminum alloy and having the inner hole 30 which is defined by the plurality of recesses and protrusions 32, 34 as described above can be produced easily by extrusion in the following manner.

Initially, there is prepared a solid cylindrical billet made of a preselected aluminum alloy. This billet is extruded by using a suitable die 36 as shown in FIG. 6, so that an extrudate 38 in the form of a hollow continuous body is obtained whose cross sectional shape is identical with that of the outer sleeve 14 to be obtained. The extrudate 38 is cut into a plurality of outer sleeves 14 as described later. The extrudate 38 consists of a cylindrical portion which extends in a direction of extrusion of the billet and a pair of leg portions which are integrally formed with the cylindrical portion. The cylindrical portion of the extrudate 38 gives the respective cylindrical body portions 20 of the plurality of outer sleeves 14 while the pair of leg portions of the extrudate 38 give the respective pairs of legs 22, 22, after the extrudate 38 is cut into the plurality of outer sleeves 14. The cylindrical portion of the extrudate 38 has an extruded inner hole 40 which extends in the extrusion direction and which gives the respective inner holes 30 of the plurality of outer sleeves 14 to be obtained.

Although the aluminum alloy used for the outer sleeve 14 is not particularly limited, it is preferable to employ an Al-Mg-Si aluminum alloy such as JIS (Japanese Industrial Standard) 6061 or 6N01, because the Al-Mg-Si aluminum alloy has high degrees of mechanical strength and corrosion resistance. As the extrusion method for obtaining the extrudate 38, it is preferable to employ a hot extrusion method which is generally employed for the extrusion of an aluminum alloy. Further, a known die such as a bridge die or a port hole die is suitably used as the die 36. In this case, the solid cylindrical billet can be formed into the extrudate 38 in the form of the hollow continuous body, by using only the die 36. It is noted that the extrudate 38 can be obtained by extruding a hollow billet using a mandrel, as usually effected in the extrusion of a steel pipe, for instance.

The die 36 has an inner portion in the form of a cylindrical mandrel not shown for forming the extruded inner hole 40 of the extrudate 38. On the outer circumferential surface of the inner portion of the die 36, there are formed a multiplicity of protrusions and recesses extending in the axial direction thereof. According to this arrangement, the extrudate 38 obtained by extruding the solid cylindrical billet through the thus formed die 36 has the inner circumferential surface including the recesses and the protrusions which cooperate with each other to define the extruded inner hole 40 and each of which continuously extends in the axial direction of the inner hole 40, whereby each of the outer sleeves 14 to be obtained has the inner circumferential surface 30 including the recesses and protrusions 32, 34.

As shown in FIG. 7, the extrudate 38 obtained as described above is cut by a cutter 42 into a plurality of the outer sleeves 14 such that each of the outer sleeves 14 has a suitable axial length. The bolt hole 28 is formed through the thickness of each of the legs 22 before or after the cutting operation, so that the intended outer sleeve 14 is obtained. Prior to the cutting operation, the extrudate 38 is subjected as needed to a suitable levelling treatment using a stretcher, for instance, so as to remove strain or deformation therefrom. The extrudate 38 is also subjected as needed to a suitable heat treatment such as hardening for improvement of the quality of the alloy before or after the cutting operation.

According to the above-described process of the present invention, the recesses 32 and the protrusions 34 are formed over the inner circumferential surface of the cylindrical body portion 20 of the outer sleeve 14 at the same time when the outer sleeve 14 is manufactured by the extrusion, without requiring any exclusive device or additional process for forming the recesses and protrusions 32, 34. Thus, the outer sleeve 14 can be produced with extremely enhanced efficiency while assuring reduced cost of manufacture thereof. The presence of the recesses and protrusions 32, 34 formed as described above according to the present process advantageously assures improved bonding strength of the elastic member 16 with respect to the inner circumferential surface of the cylindrical body portion 20 of the outer sleeve 14.

The recesses 32 and the protrusions 34 are continuously formed over the entire axial length of the inner circumferential surface of the outer sleeve 14 as a result of the extrusion using the above-described die 36, without needing any additional or exclusive operation for forming the recesses and protrusions 32, 34 on the individual outer sleeves 14, whereby the recesses 32 and the protrusions 34 are formed with high stability. Accordingly, this arrangement stably assures improved bonding strength of the elastic member 16 to the outer sleeve 14, leading to a reduced number of deficient products due to insufficient bonding strength of the elastic member 16.

The present process as described above enables a plurality of outer sleeves 14 which are identical with each other to be produced at the same time owing to the extrusion, resulting in considerably enhanced efficiency and reduced cost in manufacturing the outer sleeve 14.

In the present embodiment, each of the legs 22, 22 having a constant cross sectional shape in its axial direction continuously extends over the entire axial length of the cylindrical body portion 20. Thus, the legs 22 can be formed integrally with the cylindrical body portion 20 by the extrusion, to thereby assure further improved efficiency in manufacturing the outer sleeve 14.

While the present invention has been described in its preferred embodiments, it is to be understood that the invention is not limited to the details of the illustrated embodiments, but may be otherwise embodied.

For instance, the legs 22 of the outer sleeve 14 may be eliminated, and the outer sleeve 14 may consist solely of the cylindrical body portion 20.

The configuration or profile of the inner hole 30 or the cylindrical body portion 20 of the outer sleeve 14 is not particularly limited, but various shapes such as an ellipse or a rectangle may be suitably employed as a cross-section profile of the cylindrical body portion 20 or the inner hole 30.

Further, the configuration of the elastic member 16 may be suitably changed depending upon the required damping characteristics of an engine mount. For instance, the spring characteristics of the elastic member 16 may be adjusted by forming one or more slits extending in its axial direction or providing a suitable restricting member.

While the illustrated embodiment relates to the engine mount 10 for a motor vehicle, the principle of the present invention is equally applicable to various other types of elastic mounts such as a body mount, a differential mount or a bushing for use on a motor vehicle, and elastic mounts used for various devices other than those for the motor vehicle.

As clearly understood from the above description, in the elastic mount constructed according to the present invention, the bonding area of the elastic member with respect to the outer sleeve formed of the aluminum alloy is effectively increased owing to the existence of the recesses and protrusions having the particular shapes and formed over the inner circumferential surface of the outer sleeve. Therefore, the present engine mount enjoys sufficiently enhanced bonding strength of the elastic member to the outer sleeve.

Further, according to the process of manufacturing the elastic mount, the recesses and protrusions are formed over the inner circumferential surface of the outer sleeve at the same time when the outer sleeve is produced by extrusion, without requiring any exclusive or additional operation for forming the recesses and protrusions. Thus, the bonding area of the elastic member to the outer sleeve formed of the aluminum alloy is increased without needing any particular surface-roughening treatment, to thereby assure a considerably high degree of the bonding strength of the elastic member.

It is to be understood that the present invention may be embodied with various changes, modifications and improvements, which may occur to those skilled in the art without departing from the spirit and scope of the invention defined in the following claims.

What is claimed is:

1. An elastic mount comprising:
   an outer hollow member which is formed of an aluminum alloy and has an inner hole;
   an inner shaft member which extends in said inner hole of said outer member;
   an elastic member which is formed by vulcanization of a rubber material in said inner hole between said outer member and said inner member to elastically connect the outer and inner members to each other;
   said outer member having an inner circumferential surface including a plurality of recesses and a plurality of protrusions which cooperate with each other to define said inner hole and each of which continuously extends in an axial direction of the inner hole;
   said recesses and said protrusions being alternate with each other at a pitch of 0.5 mm to 2.0 mm in a circumferential direction of said inner hole;
   a top end of each of said protrusions having a height of 0.3 mm to 1.0 mm from respective bottom ends of the two recesses on both sides of, and adjacent to, said each protrusion;
   said elastic member being directly bonded to said inner surface of said outer member by the vulcanization of said rubber material.

2. An elastic mount according to claim 1, wherein said outer hollow member comprises a generally cylindrical outer hollow member having a cylindrical inner hole, and said inner shaft member comprises a cylindrical inner shaft member extending in said cylindrical inner hole of said generally cylindrical outer member.

3. An elastic mount according to claim 1, wherein said inner circumferential surface of said outer hollow member comprises a continuous surface which is continuous in said circumferential direction of said inner hole and has a corrugated shape defined by respective inner surfaces of said recesses and respective outer surfaces of said protrusions.

4. An elastic mount according to claim 3, wherein said inner surfaces of said recesses and said outer surfaces of said protrusions have a radius of curvature falling in a range of 0.3 mm to 1.0 mm.

5. An elastic mount according to claim 1, wherein said outer hollow member has at least one flat end face in which said inner hole opens, and said elastic member comprises an end portion covering at least a portion of said flat end face so that a surface of said elastic member bonded to said outer member ends on said flat end face.

6. An elastic mount according to claim 1, wherein said outer hollow member includes at least one integral connection portion which projects from an outer surface thereof and continuously extends over an entire length thereof in said axial direction, said connection portion being adapted to be connected to a support member for fixing the elastic mount to the support member.

7. An elastic mount according to claim 6, wherein said connection portion has a through-hole which extends therethrough over an entire axial length thereof in said axial direction.

8. A process of manufacturing an elastic mount, comprising the steps of:
   extruding an aluminum-alloy blank to obtain an extrudate having an extruded inner hole which continuously extends in a direction of extrusion of said blank, said extrudate having an inner circumferential surface including a plurality of recesses and a plurality of protrusions which cooperate with each other to define said extruded inner hole and each of which continuously extends in the extrusion direction, said recesses and said protrusions being alternate with each other at a pitch of 0.5 mm to 2.0 mm in a circumferential direction of said extruded inner hole, a top end of each of said protrusions having a height of 0.3 mm to 1.0 mm from respective bottom ends of the two recesses on both sides of, and adjacent to, said each protrusion;
   cutting said extrudate into a plurality of outer hollow members each of which has a predetermined length in said extrusion direction, said each outer member having a cut inner hole having said predetermined length in said extrusion direction;
   placing an inner shaft member in said each outer member such that said inner member extends in said cut inner hole of said each outer member; and
   vulcanizing a rubber material between said each outer member and said inner member to produce an elastic member bonded to said inner member and said inner surface of said outer member and thereby elastically connect the inner and outer members to each other.

9. A process according to claim 8, wherein the step of extruding said aluminum-alloy blank comprises extruding said aluminum-alloy blank to obtain said extrudate comprising a generally cylindrical extrudate having an extruded cylindrical inner hole, the step of cutting said extrudate comprises cutting said extrudate into a plurality of generally cylindrical outer hollow members each of which has a cut inner hole having a predetermined length in said extrusion direction, and the step of placing said inner shaft member comprises placing said inner shaft member comprising a cylindrical inner shaft member, in said cut cylindrical inner hole of said each generally cylindrical outer member, such that said cylindrical inner shaft member extends in said cut cylindrical inner hole.

10. A process according to claim 8, wherein the step of extruding said aluminum-alloy blank comprises extruding said aluminum-alloy blank to obtain said extrudate having said inner circumferential surface comprising a continuous surface which is continuous in said circumferential direction of said inner hole and has a corrugated shape defined by respective inner surfaces of said recesses and respective outer surfaces of said protrusions.

11. A process according to claim 8, wherein the step of cutting said extrudate comprises cutting said extrudate into said outer hollow members each of which has at least one flat end face in which said cut inner hole opens, and the step of vulcanizing said rubber material comprises vulcanizing said rubber material into said elastic member including an end portion covering at least a portion of said flat end face so that a surface of said elastic member bonded to said each outer member ends on said flat end face.

12. A process according to claim 8, wherein the step of extruding said aluminum-alloy blank comprises extruding said aluminum-alloy blank to obtain said extrudate comprising at least one integral connection portion which projects from an outer surface thereof and continuously extends over an entire length thereof in said extrusion direction, said connection portion being adapted to be connected to a support member for fixing the elastic mount to the support member.

* * * * *